Patented Apr. 2, 1929.

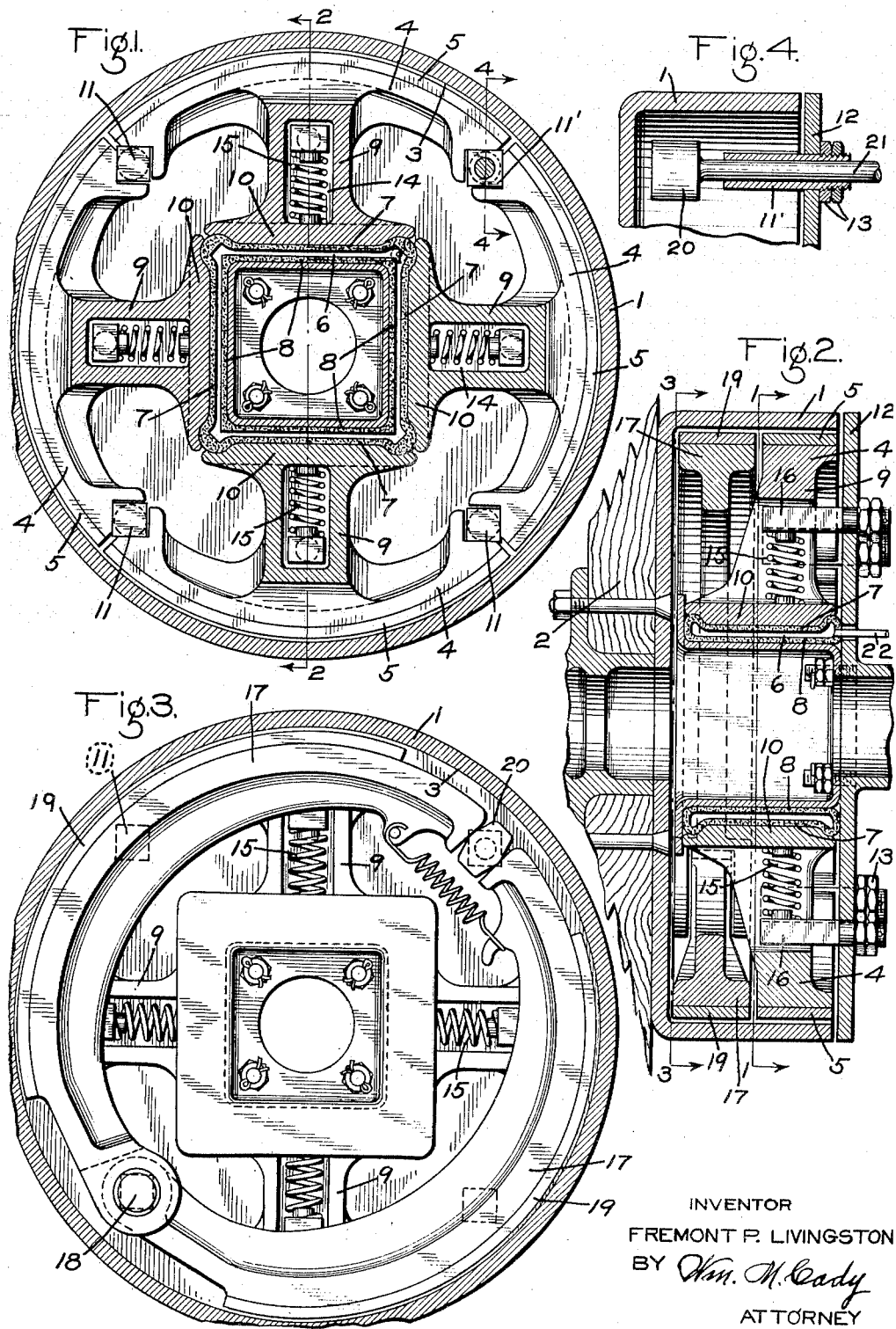

1,707,272

UNITED STATES PATENT OFFICE.

FREMONT P. LIVINGSTON, OF DENVER, COLORADO, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed February 18, 1926. Serial No. 89,101.

This invention relates to brakes of the internal expanding drum type and more particularly adapted for application to either the front or rear wheels of a motor vehicle.

The principal object of my invention is to provide an improved brake of the internal expanding drum type.

In the accompanying drawing, Fig. 1 is a section, on the line 1—1 of Fig. 2, of an internal expanding drum brake embodying my invention; Fig. 2 a section on the line 2—2 of Fig. 1; Fig. 3 a section on the line 3—3 of Fig. 2; and Fig. 4 a section on the line 4—4 of Fig. 1.

The construction shown in the drawing comprises a brake drum 1, secured to a vehicle wheel 2 and having an internal friction face 3. Mounted within said drum are brake heads 4, preferably four in number and having brake shoes 5 adapted to engage the friction face 3 of the brake drum.

Disposed centrally within the brake drum 1 is a collapsible diaphragm 6 of flexible material, such as rubber, and having four outer side walls 7 and four corresponding inner walls 8, the respective inner and outer side walls being joined to form a one piece diaphragm brake chamber.

Each brake head 4 is provided with a centrally disposed, inwardly extending lug 9 having a pressure plate 10 at the inner end, which is adapted to engage a corresponding outer side wall 7 of the diaphragm 6. The adjacent ends of adjacent brake heads are notched to receive an anchor member 11, preferably rectangular in cross section, the members 11 being extended through openings in the cover plate 12 of the brake drum 1, and having threaded ends provided with nuts 13, by which the anchor members may be secured to the cover plate.

Each lug 9 is provided with an elongated opening 14 in which is mounted a release spring 15. A stud 16, secured to the cover plate 12, extends into each opening 14 and serves as a fixed abutment for one end of each release spring, so that each spring acts upon releasing the brakes to move the corresponding brake head to release position.

In addition to the fluid pressure controlled brake above described, a mechanically operated brake may also be provided, which utilizes the same brake drum 1. Said mechanically operated brake may comprise brake heads 17 connected at one end by a hinge pin 18 and having brake shoes 19 adapted to engage the internal friction face 3 of the brake drum. Interposed between the free ends of the brake heads 17 is a cam 20 which is carried by an operating shaft 21. The shaft 21 extends through a bore provided in the anchor member 11' and is adapted to be operated mechanically in the usual manner.

In operation, if it is desired to apply the brakes by fluid under pressure, fluid is supplied by suitable means, through a pipe 22, to the chamber formed within the diaphragm 6, and thereby the outer side walls 7 of the diaphragm are expanded. The pressure plates 10 of the several brake heads 4 are then moved radially outward, causing the brake shoes 5 to frictionally engage the internal friction face 3 of the brake drum 1.

In this movement of the brake heads 4, the members 11 serve as stops to prevent rotative movement of the brake heads and also act as guides to ensure radial movement of the brake heads.

In order to release the brakes, fluid under pressure is released through pipe 22 from the diaphragm chamber and the release springs 15 then act to move the brake heads 4 to release position. The anchor members 11 also serve to limit the release movement of the brake heads and chattering of the brake heads is prevented by the engagement of the brake heads with the members 11.

If it is desired, for any reason, to apply the brakes mechanically, the shaft 21 is rotated, so as to cause the rotation of the cam 20 and thereby the brake heads 17 are expanded, so that the brakes shoes 19 will frictionally engage the internal friction face 3 of the brake drum 1.

Having now described my invention, what I claim as new and desire to secure by Letters Patent, is:—

1. The combination with a brake drum having an internal friction face and a plurality of radially movable brake heads mounted end to end within said drum, of a fixed stud, rectangular in cross section and interposed between adjacent ends of the brake heads, the ends of the brake heads being notched to receive said stud.

2. The combination with a brake drum having an internal friction face and four radially movable brake heads disposed end to end within said drum, of fixed studs, rectangular in cross section, one disposed between each pair of adjacent ends of said heads and engaging in corresponding notches in said ends.

In testimony whereof I have hereunto set my hand.

FREMONT P. LIVINGSTON.